United States Patent
Yazaki

(10) Patent No.: US 10,819,172 B2
(45) Date of Patent: Oct. 27, 2020

(54) ROTOR FOR ROTATING ELECTRIC MACHINE, MAGNETIC STEEL SHEET FOR ROTATING ELECTRIC MACHINE, AND ELECTRIC VEHICLE

(71) Applicant: HONDA MOTOR CO., LTD., Tokyo (JP)

(72) Inventor: Manabu Yazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 16/108,662

(22) Filed: Aug. 22, 2018

(65) Prior Publication Data

US 2019/0068012 A1 Feb. 28, 2019

(30) Foreign Application Priority Data

Aug. 25, 2017 (JP) .................. 2017-161877

(51) Int. Cl.
| | |
|---|---|
| *H02K 1/27* | (2006.01) |
| *H02K 1/28* | (2006.01) |
| *H02K 9/19* | (2006.01) |
| *H02K 1/32* | (2006.01) |
| *H02K 15/02* | (2006.01) |
| *H02K 1/14* | (2006.01) |

(52) U.S. Cl.
CPC ............. *H02K 1/276* (2013.01); *H02K 1/146* (2013.01); *H02K 1/2766* (2013.01); *H02K 1/28* (2013.01);

(Continued)

(58) Field of Classification Search
CPC ........ H02K 1/27; H02K 1/276; H02K 1/2766; H02K 1/28; H02K 9/193; H02K 1/32;
(Continued)

(56) References Cited

U.S. PATENT DOCUMENTS

| | | | |
|---|---|---|---|
| 2013/0020889 A1 | 1/2013 | Yamamoto et al. | |
| 2014/0225471 A1 | 8/2014 | Kawanami | |

(Continued)

FOREIGN PATENT DOCUMENTS

| | | |
|---|---|---|
| CN | 103563219 A | 2/2014 |
| CN | 103944297 A | 7/2014 |

(Continued)

OTHER PUBLICATIONS

Tsutomu (WO 2013136405 A1) English Translation (Year: 2013).*

(Continued)

*Primary Examiner* — Tulsidas C Patel
*Assistant Examiner* — Robert E Mates
(74) *Attorney, Agent, or Firm* — Rankin, Hill & Clark LLP

(57) ABSTRACT

A rotor for a rotating electric machine is disclosed which includes a rotor yoke including annular magnetic steel sheets stacked in an axial direction having magnet slots into which magnets inserted, Each magnetic steel sheet includes first through-holes to form the first internal cavities; second through-holes, each having a shape fit for each second internal cavity and configured to form part of one of the second internal cavities; and third through-holes, each having a shape for communication between one of the first internal cavities and one of the second internal cavities and to form, with one of the second through-holes, part of the one of the second internal cavities.

6 Claims, 6 Drawing Sheets

(52) U.S. Cl.
CPC ............... *H02K 1/32* (2013.01); *H02K 9/19* (2013.01); *H02K 15/024* (2013.01); *B60L 2220/50* (2013.01)

(58) Field of Classification Search
CPC ...... H02K 9/197; H02K 1/146; H02K 15/024; B60L 2220/50
USPC ............ 310/54, 58, 216.011, 59, 156.53, 61, 310/60 A, 40 R, 156.57
See application file for complete search history.

(56) References Cited

U.S. PATENT DOCUMENTS

| | | |
|---|---|---|
| 2015/0084469 A1 | 3/2015 | Yazaki |
| 2015/0381015 A1 | 12/2015 | Hattori |
| 2017/0163110 A1 | 6/2017 | Hattori |

FOREIGN PATENT DOCUMENTS

| | | | |
|---|---|---|---|
| CN | 103997143 A | 8/2014 | |
| CN | 106464051 A | 2/2017 | |
| JP | H03-60855 U | 6/1991 | |
| JP | 2004-194419 A | 7/2004 | |
| JP | 2006-067777 A | 3/2006 | |
| JP | 2015-061466 A | 3/2015 | |
| JP | 2017-093059 A | 5/2017 | |
| WO | WO-2013136405 A1 * | 9/2013 | ............... H02K 1/32 |

OTHER PUBLICATIONS

Office Action received in corresponding CN application No. 201810804456.1 dated Mar. 23, 2020 with English translation (18 pages).

\* cited by examiner

ROTOR FOR ROTATING ELECTRIC MACHINE, MAGNETIC STEEL SHEET FOR ROTATING ELECTRIC MACHINE, AND ELECTRIC VEHICLE

This application claims the priority of Japanese Patent Application No. 2017-161877, filed on Aug. 25, 2017 in the Japan Patent Office, the entire specification, claims and drawings of which are incorporated herewith by reference.

TECHNICAL FIELD

The present invention relates to a rotor for a rotating electric machine, a magnetic steel sheet for the rotating electric machine, and an electric vehicle.

BACKGROUND ART

Rotating electric machine rotors used for vehicles each have: a rotor yoke produced by stacking magnetic steel sheets; and magnets attached to the rotor yoke. Meanwhile, to decrease the inertial mass of a rotor or to circulate a refrigerant through a rotor, etc., a yoke of the rotor has internal cavities provided in a axial direction. Japanese Patent Application Publication No. 2015-61466A and Japanese Utility Model Laid-Open No. 03-60855 describe technologies where magnetic steel sheets for a rotor are subjected to rotary lamination (i.e., stacked while the position of each magnetic steel sheet is shifted in a circumferential direction) so as to create spiral internal cavities. Japanese Patent Application Publication No. 2004-194419 describes a technology where the shape of a rib is devised to decrease the inertial mass of a rotor.

SUMMARY OF INVENTION

An aspect of the present invention provides a rotor for a rotating electric machine, comprising
a rotor yoke comprising a plurality of substantially annular magnetic steel sheets stacked in an axial direction of a rotation shaft while a plurality of magnet slots are formed therein and
magnets inserted into the magnet slots,
the rotor yoke comprising
a plurality of first internal cavities formed in the axial direction on an inner circumference side of the magnet slots and
a plurality of second internal cavities provided in the axial direction on an outer circumferential side of the first internal cavities,
each magnetic steel sheet comprising:
a plurality of first through-holes configured to form the first internal cavities;
a plurality of second through-holes, each having a shape fit for each second internal cavity and configured to form part of one of the second internal cavities; and
a plurality of third through-holes, each having a shape allowing for communication between one of the first internal cavities and one of the second internal cavities and configured to form, with one of the second through-holes, part of the one of the second internal cavities.

DESCRIPTION OF EMBODIMENTS

Prior to describing embodiments of the present invention, the above-mentioned related art will be further argued.

In the magnet-embedded rotor, heat generation becomes large near magnets. To effectively cool the magnets, it is preferable to make short the distance between each magnet and a refrigerant-circulating internal cavity. However, regarding a rotor having several sets of magnets arranged like a V shape, a region having a high magnetic flux density occurs intermittently on the inner circumference side of the magnets. When this region having a high magnetic flux density is interrupted by the internal cavity, the magnetic resistance becomes large, thereby increasing a loss unfortunately.

The present invention has been made in view of the above-mentioned situations. The present invention provides a rotor for a rotating electric machine, a magnetic steel sheet for the rotating electric machine, and an electric vehicle such that magnets are appropriately cooled while the magnetic resistance is suppressed. The present invention makes it possible to appropriately cool magnets while the magnetic resistance is suppressed.

Hereinbelow embodiments of the present invention are described.

<Configuration>

Figure 1:
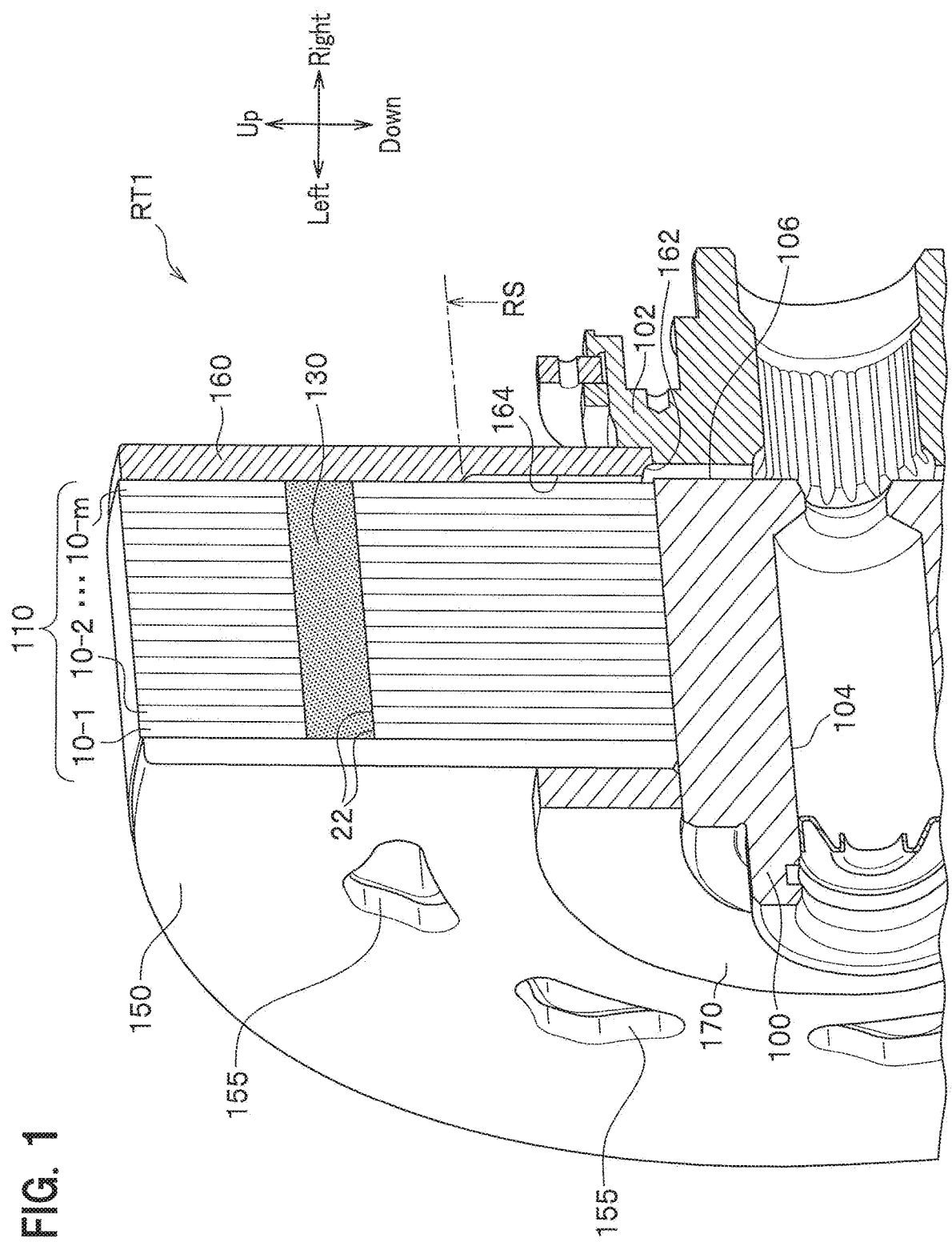
FIG. 1 is a perspective view of a rotor, in which some parts are cut and omitted, according to an embodiment of the present invention.

FIG. 1 is a perspective view of a rotor RT1 (a rotor for a rotating electric machine), in which some parts are cut and omitted, according to an embodiment of the present invention.

Note that the rotor RT1 is surrounded by a stator (not shown), and a rotating electric machine includes the rotor RT1 and the stator. This rotating electric machine is used for driving an electric vehicle and works as an electric motor or generator. The "up-down" and "left-right" directions shown in the figure correspond to the travel directions of the electric vehicle when the rotor RT1 is installed on the electric vehicle. Then, a direction perpendicular to the "up-down" and "left-right" directions is the front-rear direction.

The rotor RT1 includes: a substantially cylindrical shaft 100; a substantially cylindrical rotor yoke 110 through which the shaft 100 is inserted; and magnets 130 embedded in the rotor yoke 110. The rotor yoke 110 is manufactured such that m pieces (m is 2 or more) of magnetic steel sheets 10-1 to 10-*m* (magnetic steel sheets for a rotating electric machine) are subjected to rotary lamination (stacked while the position of each magnetic steel sheet is shifted in a circumferential direction) and then connected to each other by crimping, bonding, welding, etc., to produce them as a unit. Note that the magnetic steel sheets 10-1 to 10-*m* may each be generally referred to as a "magnetic steel sheet 10". The magnetic steel sheet 10 has a plurality of internal cavities through which a refrigerant circulates. In FIG. 1, the internal cavities are not depicted.

A hollow portion 104 of the shaft 100 is a flow channel through which a refrigerant (not shown) circulates.

Substantially annular end plates 150 and 160 pinch both left and right end surfaces of the rotor yoke 110. These end plates 150 and 160 are used to fix the magnets 130 in the rotor yoke 110, thereby preventing the magnets 130 from scattering. In addition, a press-in ring 170 is pressed in around the shaft 100.

On the right side of the end plate 160, the shaft 100 has a large-diameter portion 102 having an extended outer diameter. The end plates 150 and 160 and the rotor yoke 110 are sandwiched between the large-diameter portion 102 and the press-in ring 170, so that they are under pressure in the axial direction (left-right direction). In addition, on the somewhat left side of the large-diameter portion 102, the shaft 100 has an oil filler hole 106 allowing for communication from the hollow portion 104 of the shaft 100 to the outer boundary of the shaft 100.

Regarding the end plate 160, a portion facing the oil filler hole 106 has an annular notch 162 formed by providing a groove-shaped notch along the circumferential direction. In addition, the left surface of the end plate 160 has a recessed portion 164 where a substantially annular recess is formed from the annular notch 162 to the position of the radius RS.

When a refrigerant is supplied from the oil filler hole 106 to the annular notch 162, the entire circumference of the annular notch 162 is filled with the refrigerant. Here, when the rotor RT1 rotates, the refrigerant charged in the annular notch 162 flows through the recessed portion 164 in the outer circumferential direction due to centrifugal force. Next, the refrigerant circulates through internal cavities (not shown) formed in the rotor yoke 110 and is then discharged outside of the rotor RT1 from through-holes 155 formed in the end plate 150.

Figure 2:
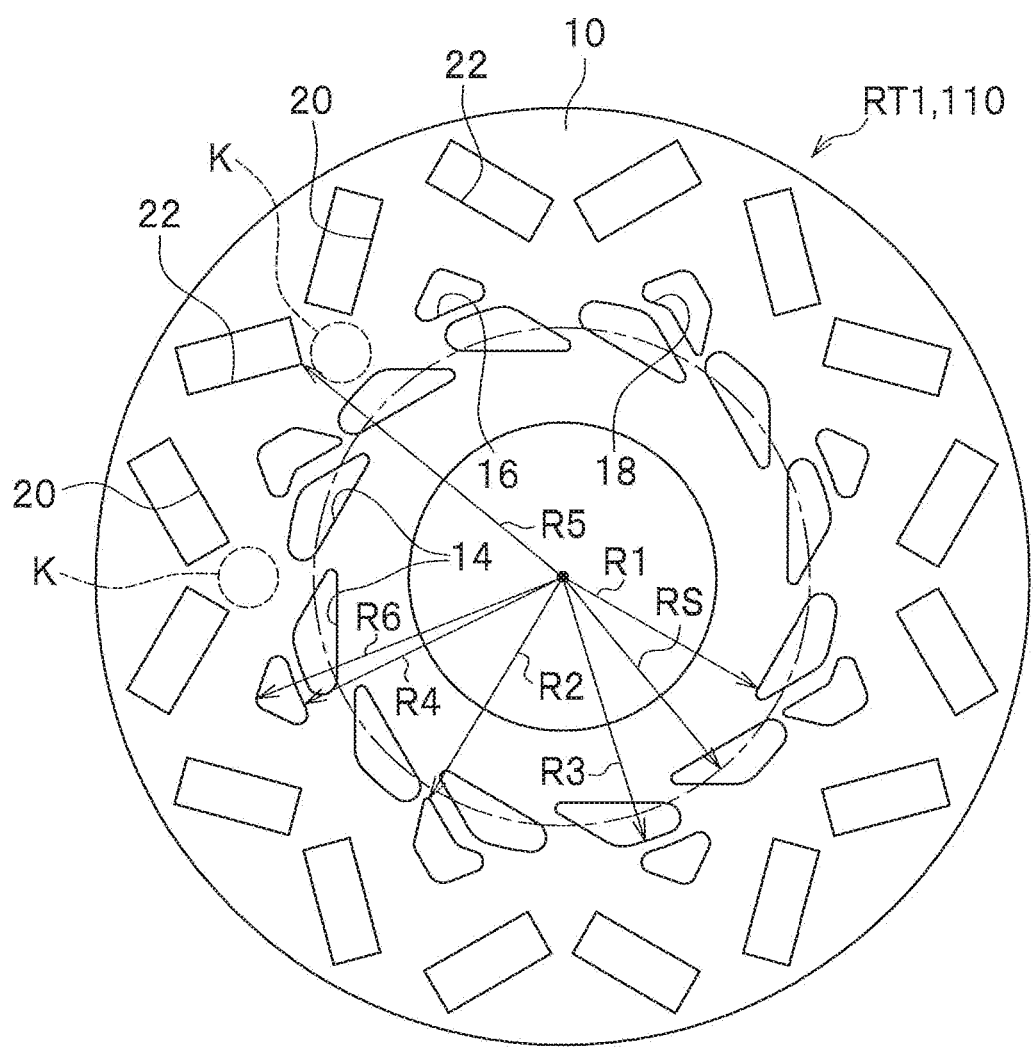
FIG. 2 is a front view of a magnetic steel sheet forming a rotor yoke.

FIG. 2 is a front view of a magnetic steel sheet 10 forming the rotor yoke 110.

The magnetic steel sheet 10 is a substantially annular flat sheet and magnet slots 20 and 22, which are through-holes, are alternately arranged along the outer circumference thereof. A plurality of pairs of the magnet slots 20 and 22 are each arranged like a V-shape, and each pair has a pair of magnets 130 (see FIG. 1) inserted to form one magnetic pole. Specifically, the rotor RT1 is a rotor having "8 poles". Note that when the number of poles of the rotor RT1 is generally expressed as n, the number of the magnet slots 20 and 22 are 2n. Here, the inner edge radius of each magnet slot 20 or 22 is set to R5.

Meanwhile, the magnetic steel sheet 10 has 12 substantially tear drop-shaped punched sections 14 (first through-holes) formed along its inner circumference. The inner edge radius R1 of each punched section 14 is shorter than a radius RS (the radius of the outer boundary of the recessed portion 164 shown in FIG. 1). In addition, the outer edge radius R3 of each punched section 14 is longer than the radius RS. Further, on the somewhat outer circumferential side of the radius RS, there are 4 sets of punched sections 16 and 18, each of which is alternately arranged every 45 degrees.

Here, the shape of each punched section 16 (second through-hole) is approximately an isosceles triangle. The inner edge radius R4 of each punched section 16 is longer than the outer edge radius R3 of each punched section 14. In addition, the outer edge radius R6 of each punched section 16 is approximately the same as the inner edge radius R5 of each magnet slot 20 or 22. The relationship between the radii R5 and R6 could be determined depending on the relationship between the magnetic resistance and the cooling capabilities to be realized. For instance, the outer edge radius R6 may be about 0.9 to 1.1 times the inner edge radius R5 and more preferably about 0.95 to 1.05 times the inner edge radius R5. In addition, each punched section 18 (third through-hole) is shaped such that each shape is further extended in the clockwise direction and toward the inner circumference side relative to each corresponding punched section 16. According to this configuration, the outer edge radius of each punched section 18 is R6 and the same as that of each punched section 16. Here, the inner edge radius R2 of each punched section 18 is shorter than the outer edge radius R3 of each punched section 14.

To summarize, the relationship is "R1<RS<R2<R3<R4<R5≅R6". When the rotor yoke 110 is configured, each magnetic steel sheet 10 is shifted 45 degrees in the circumferential direction to carry out rotary lamination. That is, each punched section 16 of one magnetic steel sheet 10 overlaps each punched section 18 of an adjacent magnetic steel sheet 10. Generally speaking, when the rotor RT1 has n poles (in this embodiment, the n is "8"), the shift angle is equal to "360 degrees/n".

A region where the magnet slots 20 and 22 face each other on the inner circumference side is called a "region K". The region K has an increased magnetic flux density, so that if some punched sections formed invade the region K, the efficiency of the rotating electric machine deteriorates. Because of this, in this embodiment, each of the punched sections 14, 16, and 18 is formed so as to avoid each region K as shown in FIG. 2.

Figure 3:
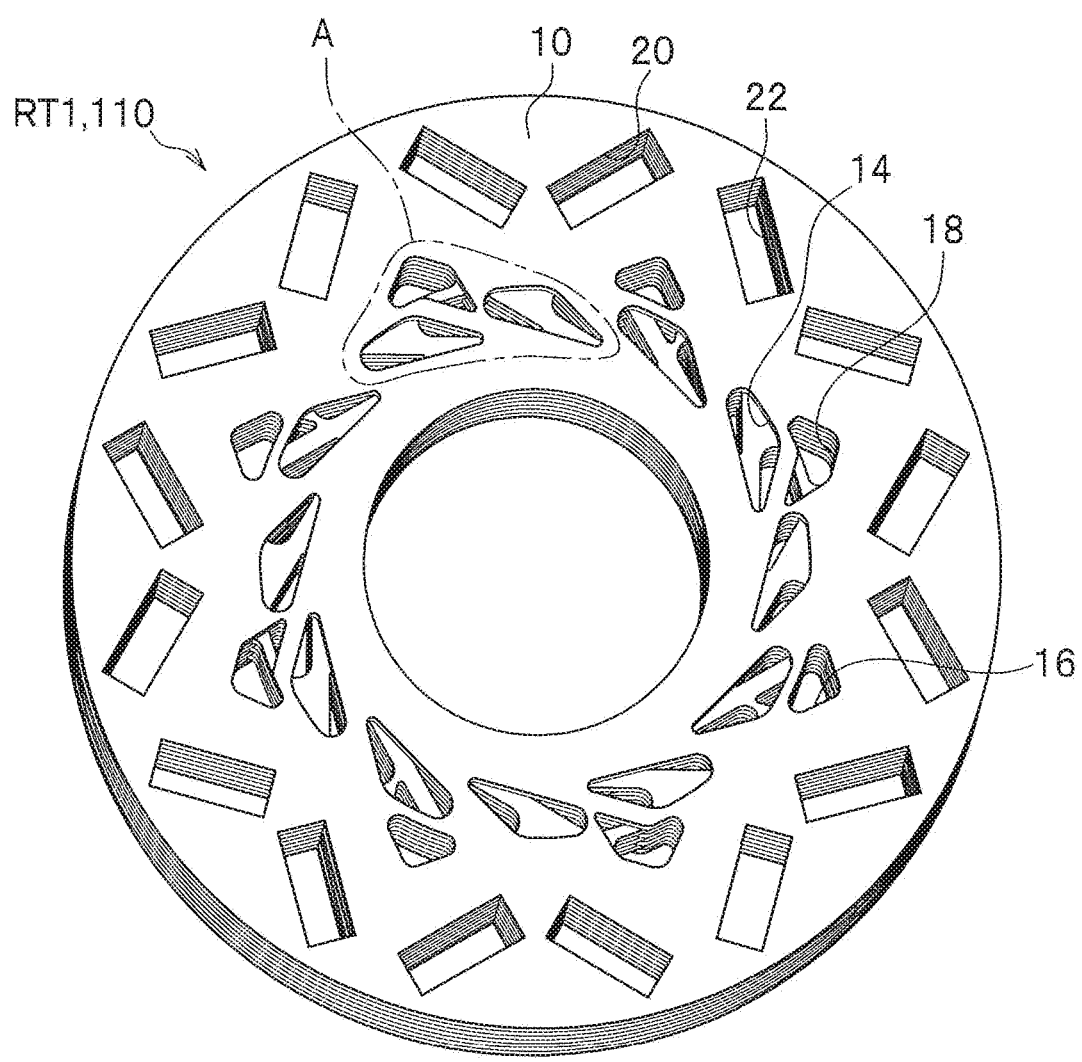
FIG. 3 is a perspective view of a state where a plurality of magnetic steel sheets have been subjected to rotary lamination.

FIG. 3 is a perspective view of a state where a plurality of magnetic steel sheets 10 have been subjected to rotary lamination. When each magnetic steel sheet 10 is subjected to rotary lamination while shifted 45 degrees in the circumferential direction, the positions of magnet slots 20 and 22 in each magnetic steel sheet 10 are matched to those of their partners. As a result, the magnet slots 20 and 22 should form substantially rectangular internal cavities extending along the axial direction. The magnet 130 shown in FIG. 1 is inserted into an internal cavity formed by a plurality of magnet slots 22.

<Operations>

Figure 4:
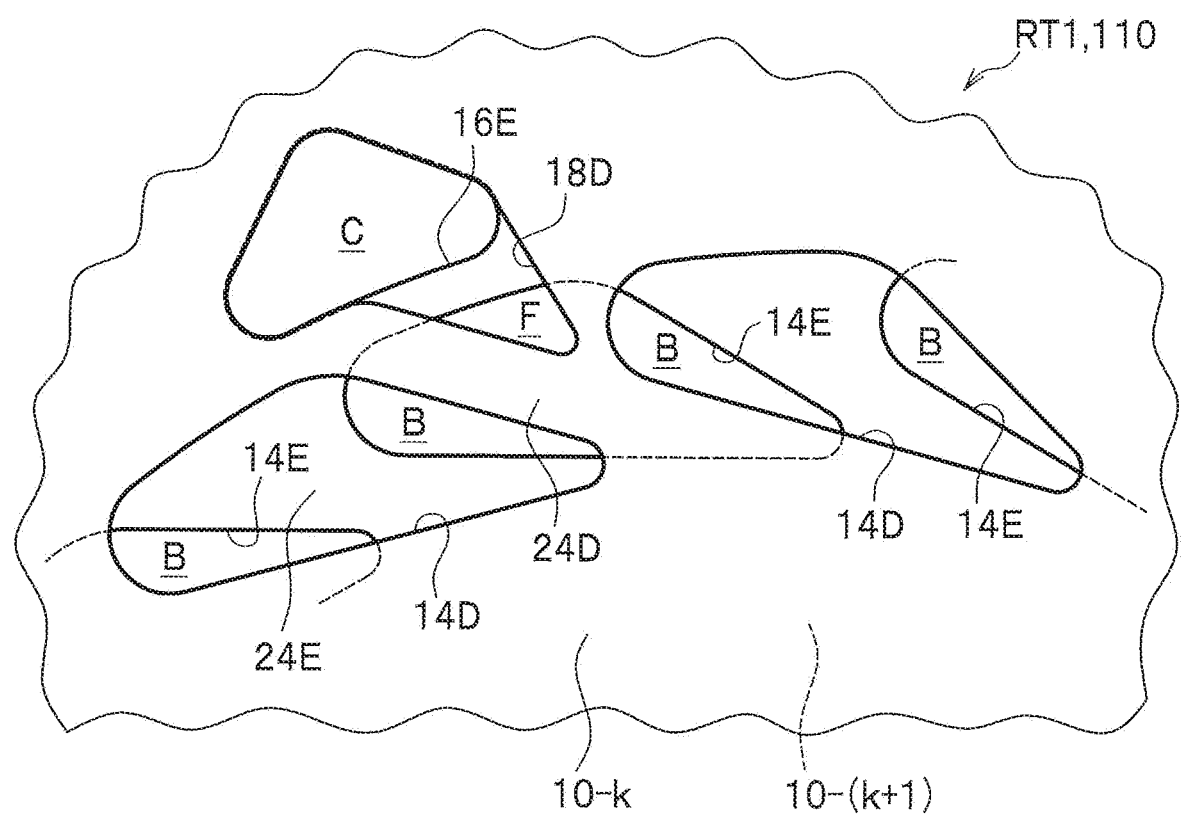
FIG. 4 is an enlarged view of a region of interest in FIG. 3.

The following describes operation of this embodiment referring to FIG. 4. Note that FIG. 4 is a magnified view of a region A in FIG. 3.

In FIG. 4, the punched sections 14D and 18D are punched sections 14 and 18 of a magnetic steel sheet 10-$k$ (the k is an odd number). In addition, the punched sections 14E, 16E, and 18E are punched sections 14, 16, and 18 of a magnetic steel sheet 10-($k$+1), namely a magnetic steel sheet 10 (the $k$+1 is an even number).

The punched sections 16E and 18D in FIG. 4 occupies a region C (second internal cavity) having the same shape as of the punched section 16E. Thus, the rotor yoke 110 has internal cavities extending in the axial direction (direction vertical to the paper sheet surface) and having the region C as a cross section shape. Each internal cavity is a passage through which a refrigerant flows from the right to left direction in FIG. 1. Each through-hole 155 formed in the end plate 150 (see FIG. 1) is in communication with this region C. Here, a region, which is other than the region C, of each punched section 18D is called a region F.

In addition, the punched sections 14D and 14E in FIG. 4 share a region B (first internal cavity) shown in the figure where both are punched in the region B. Thus, the rotor yoke 110 has internal cavities extending in the axial direction and having the region B as a cross section shape. Further, the punched section 18D allows the punched section 16E to be in communication with the punched section 14E via the region F. Generally speaking, one punched section 18 of any magnetic steel sheet 10 allows for communication between corresponding punched sections 14 and 16 of an adjacent magnetic steel sheet(s) 10 via the region F.

Hence, most of a refrigerant in the rotor yoke 110 (see FIG. 1) circulates, by means of centrifugal force, through the rotor yoke 110 from each punched section 14, via a punched section 18, to a punched section 16 to be discharged from the outer periphery portion of a region C. As shown in FIGS. 2 and 3, the punched sections 16 and 18, which form the regions C, are positioned adjacent to the magnet slots 20 and 22. Accordingly, when the magnets 130 (see FIG. 1) inserted into the magnet slots 20 and 22 generate heat, the magnets 130 can be appropriately cooled by circulating a refrigerant through the outer circumferential side of the punched sections 16 and 18.

Meanwhile, in this embodiment, the number of the punched sections 14 formed is 12. Generally speaking, when the rotor RT1 has n poles (in this embodiment, the n is "8"), the number of the punched section 14 formed is 1.5 times the n. When the number of the punched sections 14 is 1.5 times the number n of the poles in this way and each magnetic steel sheet 10 is subjected to rotary lamination while shifted 45 degrees (360 degrees/n), the formation position of each punched section 14 of one magnetic steel sheet 10 overlaps that of every other magnetic steel sheet 10.

A portion sandwiched between a set of two punched sections 14D in the magnetic steel sheet 10-$k$ ($k$ is an odd number) is called a beam 24D. A portion sandwiched between a set of two punched sections 14E in the magnetic steel sheet 10-($k$+1) (the ($k$+1) is an even number) is called a beam 24E. As shown in FIG. 4, the beam 24D fills a portion at or near the center of the punched section 14E and the beam 24E fills a portion at or near the center of the punched section 14D. This configuration makes it possible to prevent the concentration of stress at or near the punched sections 14D and 14E. Even if the area of each of the punched sections 14D and 14E is enlarged, it is possible to maintain high strength of the rotor RT1.

Comparative Example

To make clear the effects of this embodiment, the following describes the configuration of a comparative example.

Figure 5:
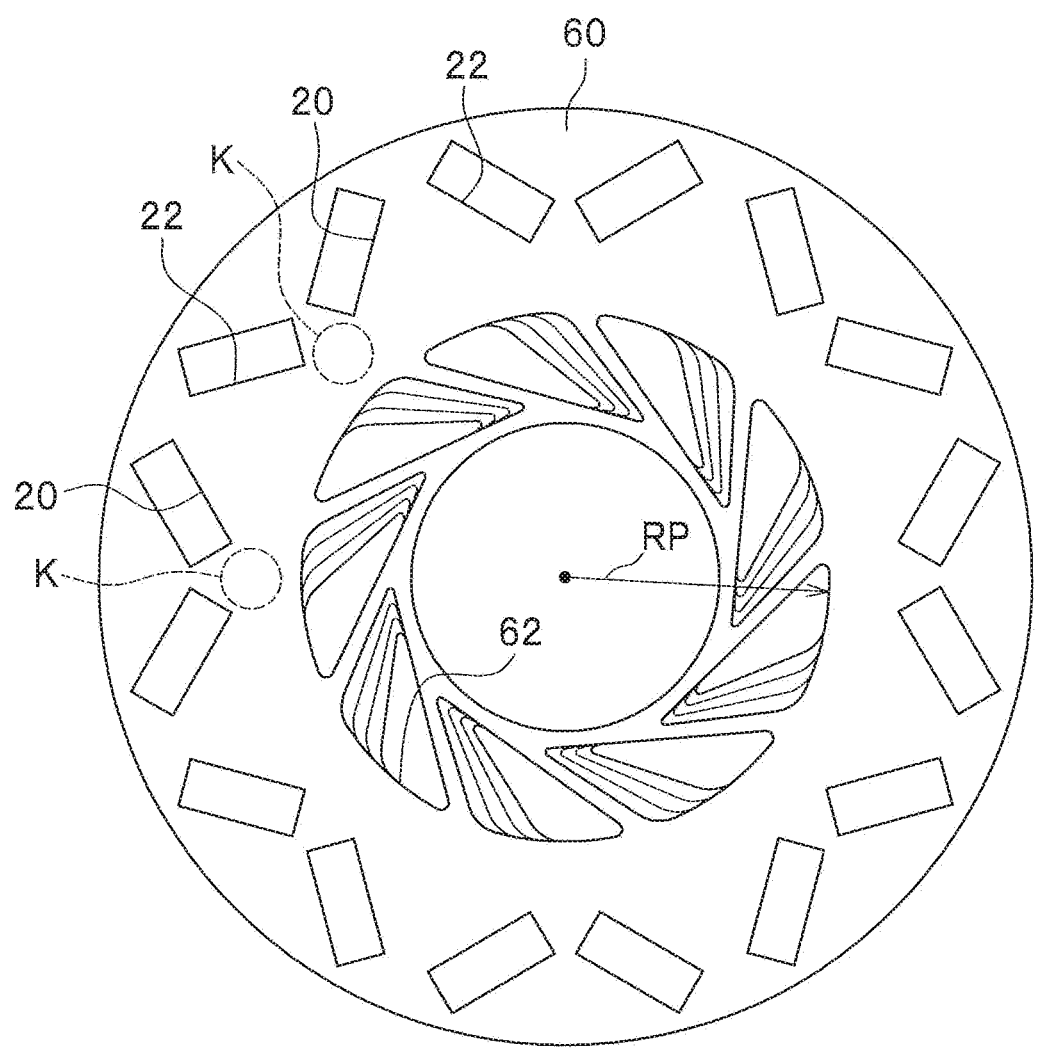
FIG. 5 is a front view in a state where several magnetic steel sheets are stacked according to a comparative example.

FIG. 5 is a front view of a state where several magnetic steel sheets 60 are stacked according to the comparative example. Note that the configuration of this comparative example is the same as of the above embodiment (see FIG. 1) except that these magnetic steel sheets 60 are used as alternatives for the magnetic steel sheets 10 (see FIG. 2). Also, the positions and sizes of the magnet slots 20 and 22 formed in each magnetic steel sheet 60 are the same as of each magnetic steel sheet 10 according to the above embodiment.

Meanwhile, in this comparative example, substantially triangular punched sections 62 are formed along the circumferential direction on the inner circumference side of the magnet slots 20 and 22. Then, a plurality of the magnetic steel sheets 60 are formed while the position of each punched section 62 is shifted some degrees (e.g., about 5 degrees) in the circumferential direction. This configuration allows the punched sections 62 to form each spiral internal cavity in the axial direction (direction vertical to the paper sheet surface). A refrigerant flowing in one punched section 62 circulates through a spiral passage along the outer peripheral portion of each punched section 62. Here, the outer edge radius of each punched section 62 is called RP.

Unfortunately, in the depicted configuration, each punched section 62 is apart from the magnet slots 20 and 22. Thus, it is impossible to appropriately cool magnets (not shown) inserted into the magnet slots 20 and 22. Also, a problem is that the weight of the rotor becomes heavy. Meanwhile, when the shape of each punched section 62 is extended as if the outer edge radius RP is enlarged outwardly, some punched sections 62 invade the region K having a high magnetic flux density. This causes a problem where the efficiency of the rotating electric machine deteriorates.

<Advantageous Effect of Embodiment>

In view of the above, this embodiment provides the rotor yoke (110) comprising a plurality of first internal cavities (B) formed along a axial direction on an inner circumference side of magnet slots (20, 22) and a plurality of second internal cavities (C) formed along the axial direction on an outer circumferential side of the first internal cavities (B), and each magnetic steel sheet (10) comprising: a plurality of first through-holes (14) configured to form the first internal cavities (B); a plurality of second through-holes (16), each having a shape fit for each second internal cavity (C) and configured to form part of one of the second internal cavities (C); and a plurality of third through-holes (18), each having a shape allowing for communication between one of the first internal cavities (B) and one of the second internal cavities (C) and configured to form, with one of the second through-holes (16), part of the one of the second internal cavities.

In this configuration, internal cavities are appropriately in communication with one another. Accordingly, while the strength of the rotor (RT1) for the rotating electric machine is maintained, it is possible to form refrigerant passages configured to be able to suppress the magnetic resistance and appropriately cool the magnets.

According to this embodiment, when the number of poles of the rotor (RT1) for the rotating electric machine is n, the number of magnet slots (20 and 22) formed is 2n per magnetic steel sheet (10); the number of the first through-holes (14) formed is 1.5n per magnetic steel sheet (10); and the number of the second through-holes (16) and the third through-holes (18) formed is n per magnetic steel sheet (10).

This configuration permits a few kinds, for instance, one kind of a magnetic steel sheet (10) to be subjected to rotary lamination so as to configure a rotor.

Meanwhile, each second through-hole (16) and each third through-hole (18) according to this embodiment is alternately arranged along the circumferential direction of one magnetic steel sheet (10).

This allows for communication, via a third through-hole (18), between first through-holes (14) and a second through-hole (16) while the strength of the rotor yoke (110) is kept.

In addition, every pair of the magnet slots (20, 22) according to this embodiment is arranged like an approximately V-shape, the open portion of which faces the center. Each second internal cavity (C) is formed while facing the open portion of the approximately V-shape formed by each corresponding pair of the magnet slots (20, 22).

According to this embodiment, each magnetic steel sheet (10) has a substantially annular shape, including a plurality of magnet slots (20, 22), a plurality of first through-holes (14), a plurality of second through-holes (16), and a plurality of third through-holes (18), wherein the outer edge radius (R3) of each first through-hole (14) is longer than the inner edge radius (R2) of each third through-hole (18); the inner edge radius (R4) of each second through-hole (16) is longer than the outer edge radius (R3) of each first through-hole (14); and the outer edge radius (R6) of each third through-hole (18) is longer than the inner edge radius (R4) of each second through-hole (16).

These features can make short the distance between the magnet slots (20, 22) and the second through-holes (16), the third through-holes (18), and the second internal cavities (C), thereby capable of eliciting high cooling capabilities.

Modification Embodiments

The present invention is not limited to the above embodiment, and various modifications are allowed. The above-described embodiment is just an example so as to explain the present invention in an understandable manner. Thus, the present invention is not limited to embodiments including all the elements described. In addition, another element may be added to the elements of the above embodiment. Alternatively, any part of the elements may be replaced by another. Examples of a possible modification regarding the above embodiment include the following.

(1) As shown in FIGS. 2 to 4, in the above embodiment, 4 pieces of each of the punched sections 16 and 18 are each alternately arranged every 45 degrees and each magnetic steel sheet 10 is subjected to rotary lamination while shifted 45 degrees. In other words, because the number n of poles of the rotor RT1 is 8, the punched sections 16 and 18 are each alternately formed every "360 degrees/n" and each magnetic steel sheet 10 is subjected to rotary lamination while shifted "360 degrees/n". However, instead of this configuration, two of the punched sections 16 and two of the punched sections 18 may be alternately formed. In this case, each magnetic steel sheet 10 is subjected to rotary lamination while shifted 90 degrees (i.e., "360 degrees/(n/2)". In this way, each punched section 16 of one magnetic steel sheet 10 can be stacked on each punched section 18 of an adjacent magnetic steel sheet(s) 10.

Figure 6:
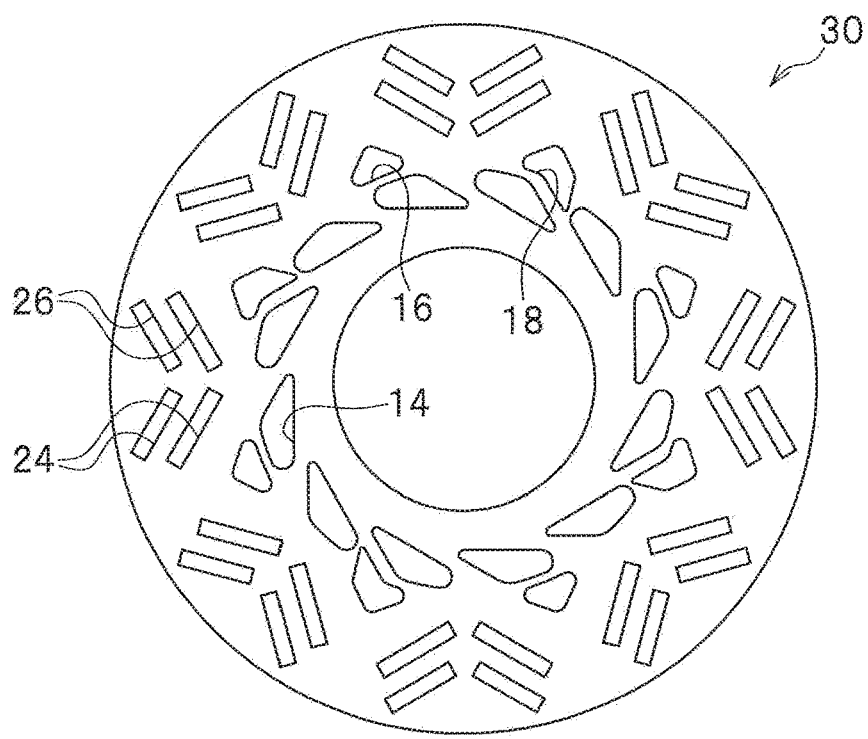
FIG. 6 is a front view of a magnetic steel sheet according to a modification embodiment.

(2) In the above embodiment, the number of poles of the rotor RT1 is n and the number of magnet slots 20 and 22 formed is 2n. However, the number of magnet slots is not limited to "2n". FIG. 6 shows a corresponding embodiment.

FIG. 6 is a front view of a magnetic steel sheet 30 according to a modification embodiment regarding the above embodiment. In this modification embodiment, the configuration of the punched sections 14, 16, and 18 is identical to that of the above embodiment. Provided that in this modification embodiment, instead of 16 pieces (2n pieces) of the magnet slots 20 and 22 according to the above embodiment, the total of 32 pieces (4n pieces) of magnet slots 24 and 26 aligned in 2 rows are formed.

Figure 7:
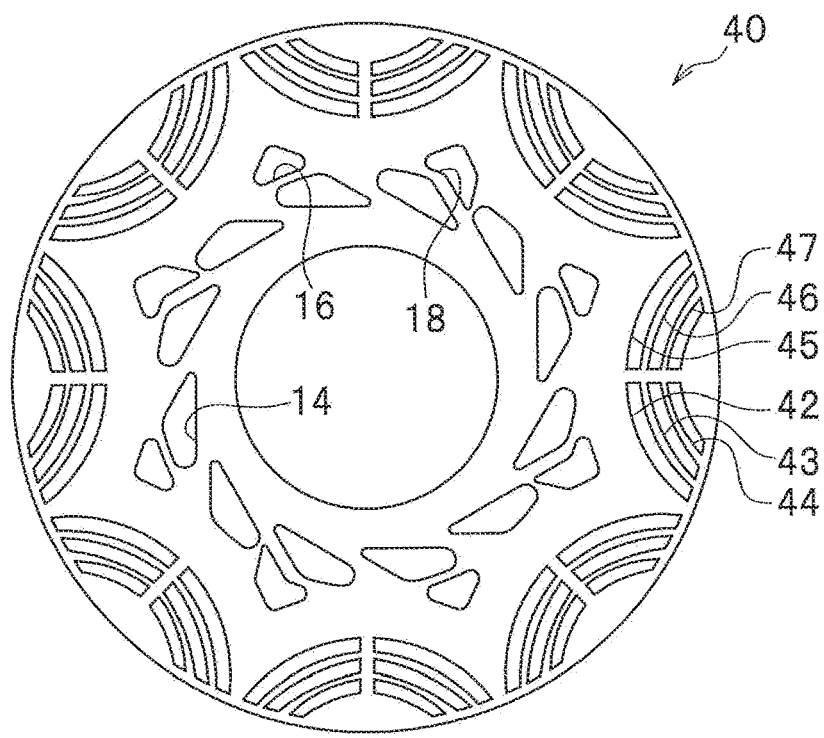
FIG. 7 is a front view of a magnetic steel sheet according to another modification embodiment.

(3) Alternatively, instead of the magnetic steel sheet 10 according to the above embodiment, it is possible to use a reluctance torque-type magnetic steel sheet, namely a magnetic steel sheet configured to generate magnet-independent torque. FIG. 7 shows a corresponding embodiment.

FIG. 7 is a front view of a magnetic steel sheet 40 according to another modification embodiment regarding the above embodiment. In this modification embodiment, the configuration of the punched sections 14, 16, and 18 is identical to that of the above embodiment. Provided that in this modification embodiment, instead of 16 pieces (2n pieces) of the magnet slots 20 and 22 according to the above embodiment, the total of 48 pieces (6n pieces) of approximately arc-shaped magnet slots 42 to 47 aligned in 3 rows are formed.

REFERENCE SIGNS LIST n The number of poles
R1 to R6 Radii
B Region (first internal cavity)
C Region (second internal cavity)
RT1 Rotor (rotor for a rotating electric machine)
10 Magnetic steel sheet (magnetic steel sheet for a rotating electric machine)
14 Punched section (first through-hole)
16 Punched section (second through-hole)
18 Punched section (third through-hole)
20, 22 Magnet slot
110 Rotor yoke
130 Magnet

The invention claimed is:

1. A rotor for a rotating electric machine, comprising:
a rotor yoke comprising a plurality of substantially annular magnetic steel sheets stacked in an axial direction of a rotation shaft while a plurality of magnet slots are formed therein, and
magnets inserted into the magnet slots,
the rotor yoke comprising
a plurality of first internal cavities formed in the axial direction on an inner circumference side of the magnet slots and
a plurality of second internal cavities provided in the axial direction on an outer circumferential side of the first internal cavities,
each magnetic steel sheet comprising:
a plurality of first through-holes configured to form the first internal cavities;
a plurality of second through-holes, each having a shape fit for each second internal cavity and configured to form part of one of the second internal cavities; and
a plurality of third through-holes, each having a shape allowing for communication between one of the first internal cavities and one of the second internal cavities and configured to form, with one of the second through-holes, part of the one of the second internal cavities,
wherein when a number of poles of the rotor is n, a number of the magnet slots formed is 2n per magnetic steel sheet,
a number of the first through-holes formed is 1.5n per magnetic steel sheet, and
a number of the second through-holes and the third through-holes formed is n per magnetic steel sheet.

2. The rotor for a rotating electric machine according to claim 1, wherein each second through-hole and each third through-hole are alternately arranged along a circumferential direction of each magnetic steel sheet.

3. The rotor for a rotating electric machine according to claim 2, wherein every pair of the magnet slots is arranged like an approximately V-shape, an open portion of which faces a center of the rotor; and
each second internal cavity is formed while facing the open portion of the approximately V-shape formed by each corresponding pair of the magnet slots.

4. An electric vehicle comprising a rotating electric machine having the rotor according to claim 1.

5. An electric vehicle comprising a rotating electric machine having the rotor according to claim 2.

6. An electric vehicle comprising a rotating electric machine having the rotor according to claim 3.

* * * * *